United States Patent
Jan et al.

(10) Patent No.: US 10,678,309 B2
(45) Date of Patent: Jun. 9, 2020

(54) CAMERA MODULE AND ELECTRONIC DEVICE

(71) Applicants: Cheng-Shiue Jan, Taipei (TW); Cheng-Ya Chi, Taipei (TW); Wei-Hao Lan, Taipei (TW); Pai-Feng Chen, Taipei (TW); Ching-Tai Chang, Taipei (TW)

(72) Inventors: Cheng-Shiue Jan, Taipei (TW); Cheng-Ya Chi, Taipei (TW); Wei-Hao Lan, Taipei (TW); Pai-Feng Chen, Taipei (TW); Ching-Tai Chang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/286,589

(22) Filed: Feb. 27, 2019

(65) Prior Publication Data
US 2019/0265760 A1 Aug. 29, 2019

Related U.S. Application Data

(60) Provisional application No. 62/636,821, filed on Feb. 28, 2018.

(51) Int. Cl.
*G03B 17/00* (2006.01)
*G06F 1/16* (2006.01)
*G03B 17/56* (2006.01)

(52) U.S. Cl.
CPC ......... *G06F 1/1686* (2013.01); *G03B 17/561* (2013.01)

(58) Field of Classification Search
USPC ........................................................ 396/428
See application file for complete search history.

(56) References Cited

U.S. PATENT DOCUMENTS

| | | | | |
|---|---|---|---|---|
| 6,118,653 A | * | 9/2000 | Kim | G06F 1/1616 361/679.23 |
| 6,930,725 B1 | * | 8/2005 | Hayashi | F16M 11/10 348/207.1 |
| 7,256,987 B2 | * | 8/2007 | Weng | G06F 1/1616 292/138 |
| 7,412,163 B2 | * | 8/2008 | Wu | G03B 17/00 16/221 |
| 7,554,523 B2 | * | 6/2009 | Chang | G06F 1/1616 345/156 |

(Continued)

OTHER PUBLICATIONS

"Office Action of Taiwan Counterpart Application," dated Dec. 9, 2019, p. 1-p. 4.

*Primary Examiner* — Rodney E Fuller
(74) *Attorney, Agent, or Firm* — JCIPRNET (57) ABSTRACT

A camera module including a camera component, a sliding member and a pivotal member is provided. The camera component is rotatably disposed on a body and includes a lens and at least one elastic positioning member. The sliding member is slidably disposed on the body and provided with at least two notches. The pivotal member is disposed on the body and connected with the camera component and the sliding member. The camera component is rotated between a closed position and an open position by the pivotal member and brings the sliding member to move. An electronic device including the camera module is also provided.

26 Claims, 5 Drawing Sheets

(56) References Cited

U.S. PATENT DOCUMENTS

| | | | |
|---|---|---|---|
| 7,800,648 B2* | 9/2010 | Lu | H04N 5/2252 |
| | | | 348/207.1 |
| 2005/0168924 A1* | 8/2005 | Wu | G06F 1/1616 |
| | | | 361/679.58 |
| 2005/0201047 A1* | 9/2005 | Krah | G06F 1/1616 |
| | | | 361/679.55 |
| 2005/0276009 A1* | 12/2005 | Kim | G06F 1/1616 |
| | | | 361/679.27 |
| 2006/0104015 A1 | 5/2006 | Fu et al. | |
| 2006/0152614 A1 | 7/2006 | Wang et al. | |
| 2007/0018949 A1* | 1/2007 | Chang | G06F 1/1616 |
| | | | 345/156 |
| 2007/0253703 A1* | 11/2007 | Tsai | G03B 17/02 |
| | | | 396/429 |
| 2013/0259462 A1 | 10/2013 | Yang et al. | |
| 2019/0219791 A1* | 7/2019 | Lan | G02B 7/023 |

* cited by examiner

CAMERA MODULE AND ELECTRONIC DEVICE

CROSS REFERENCE TO RELATED APPLICATION

This application claims the priority benefit of U.S. provisional application Ser. No. 62/636,821, filed on Feb. 28, 2018. The entirety of the above-mentioned patent application is hereby incorporated by reference herein and made a part of specification.

BACKGROUND OF THE DISCLOSURE

Field of the Disclosure

The disclosure relates to a camera module and an electronic device, and particularly to a camera module adaptable for an electronic device and an electronic device including the camera module.

Description of Related Art

In recent years, electronic devices, such as notebook computers or tablet computers, are usually provided with a camera module to provide camera operation functions (such as video, recording, photo taking, etc.). A common configuration is to mount the camera module directly on the body of the electronic device, so that the lens of the camera module is fixed on the operation surface (such as the frame of the display area) of the body.

As personal privacy is valued, rotational camera modules have also emerged. That is, when the user does not need to use the camera module, the camera module can be rotated to hide the lens, and when the user needs to use the camera module, the camera module can be rotated to expose the lens. These camera modules are typically pivoted to the body through a hinge to provide rotational operation function. However, even if the components of the camera module and the body are tightly coupled to each other to provide rotational friction in order for the camera module to be positioned at a desired position, it is likely that the camera module still generates an unexpected shift due to that the external force generated by shaking of the electronic device is greater than the rotational friction, which causes the operability of the camera module to be poor.

SUMMARY OF THE DISCLOSURE

The present disclosure provides a camera module capable of providing a rotational operation function and having good operability.

The present disclosure provides an electronic device capable of providing a rotational operation function of a camera module and having good operability.

The camera module of the present disclosure is adapted to be disposed on a body of an electronic device. The camera module includes a camera component, a sliding member and a pivotal member. The camera component is rotatably disposed on the body, and the camera component includes a lens and at least one elastic positioning member. The sliding member is slidably disposed on the body, and one end portion of the sliding member adjacent to the camera component is provided with at least two notches. The elastic positioning member abuts against the end portion of the sliding member. The pivotal member is disposed on the body and connected to the camera component and the sliding member. The camera component is rotated between a closed position and an open position through the pivotal member and drives the sliding member to move.

An electronic device of the present disclosure includes a body and a camera module. The camera module is disposed on the body. The camera module includes a camera component, a sliding member and a pivotal member. The camera component is rotatably disposed on the body, and the camera component includes a lens and at least one elastic positioning member. The sliding member is slidably disposed on the body, and one end portion of the sliding member adjacent to the camera component is provided with at least two notches. The elastic positioning member abuts against the end portion of the sliding member. The pivotal member is disposed on the body and connected to the camera component and the sliding member. The camera component is rotated between a closed position and an open position through the pivotal member and drives the sliding member to move.

In an embodiment of the present disclosure, when the camera component is located at the closed position, the lens and the sliding member are hidden in the body, and the elastic positioning member abuts against one of the two notches for positioning. When the camera component is located at the open position, the lens and the sliding member are exposed from the body, and the elastic positioning member abuts against the other one of the two notches for positioning.

In an embodiment of the present disclosure, each of the two notches respectively has an arc surface, and the elastic positioning member moves in or out of corresponding one of the two notches by moving along the arc surface.

In an embodiment of the disclosure, a rotation range of the camera component corresponds between two notches.

In an embodiment of the disclosure, the rotation range of the camera component is between 80 degrees and 100 degrees.

In an embodiment of the disclosure, the two notches include a closed notch and an open notch respectively corresponding to the closed position and the open position.

In an embodiment of the disclosure, the body is electrically connected to the open notch. When the camera component is located at the open position and the elastic positioning member abuts against the open notch, the camera component is electrically connected to the body through the elastic positioning member and the open notch.

In an embodiment of the disclosure, the sliding member is internally provided with an electrical connection line, and the body is electrically connected to the open notch through the electrical connection line.

In an embodiment of the disclosure, the elastic positioning member includes a spring connector.

In an embodiment of the disclosure, the camera component includes a first cover, and the lens and the elastic positioning member are disposed on the first cover. When the camera component is located at the closed position, the first cover is located on one lateral surface of the body, and the lens and the sliding member are hidden between the first cover and the body.

In an embodiment of the disclosure, when the camera component is located at the open position, the first cover is located on a top surface of the body, and the lens and the sliding member are exposed between the first cover and the body.

In an embodiment of the disclosure, the width of the first cover is greater than the width of the lateral surface of the body. When the camera component is located at the closed position, the first cover is located on the lateral surface of the body and protrudes from the lateral surface. When the camera component is located at the open position, the first cover is located on the top surface of the body and protrudes from the top surface.

In an embodiment of the disclosure, the camera module further includes a restoring member disposed between the body and one end of the sliding member opposite to the camera component. The restoring member accumulates a restoring force when the camera component is rotated from the closed position to the open position, and drives the sliding member to move toward inside of the body by releasing the restoring force when the camera component is rotated from the open position to the closed position.

Based on the above, in the camera module and the electronic device of the present disclosure, the camera component is rotated between the closed position and the open position through the pivotal member to drive the sliding member to move, and the elastic positioning member abuts against the end portion of the sliding member during the rotation process of the camera component. In this manner, the camera module can provide a privacy protection function or a camera operation function through rotation, and further interfere with the notch through the abutting force provided by the elastic positioning member so as to generate an obvious pause at the closed position and the open position. In this manner, the camera module and the electronic device of the present disclosure can provide the rotational operation function of the camera module and have good operability.

In order to make the aforementioned features and advantages of the disclosure more comprehensible, embodiments accompanying figures are described in detail below.

DESCRIPTION OF EMBODIMENTS

Figure 1:
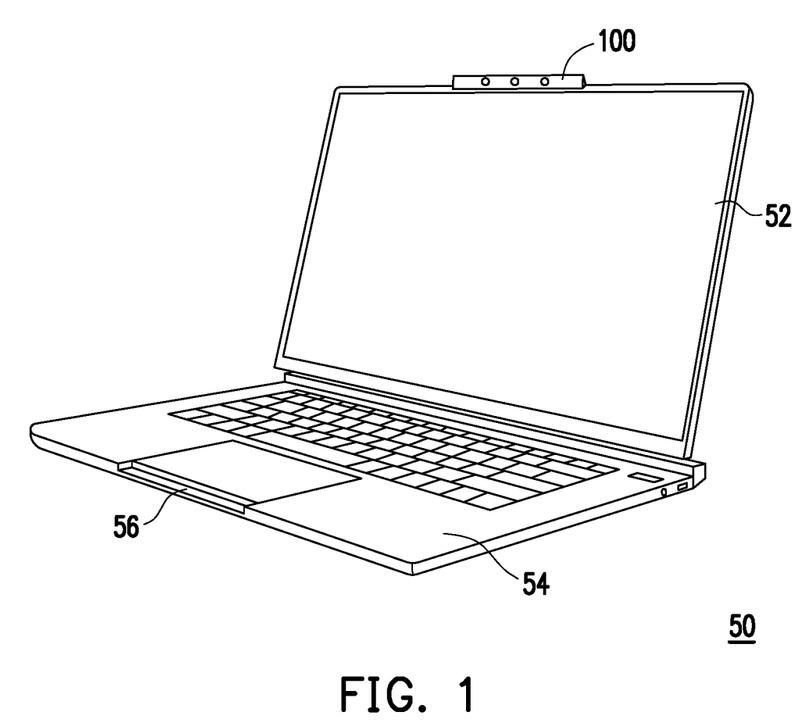
FIG. 1 is a schematic view of an electronic device according to an embodiment of the present disclosure.

FIG. 1 is a schematic view of an electronic device according to an embodiment of the present disclosure. Referring to FIG. 1, in the embodiment, an electronic device 50 includes a body 52, 54 and a camera module 100. Specifically, the electronic device 50 is, for example, a notebook computer, and has a body 52 as an upper body and having a screen assembly or the like as well as a body 54 as a lower body and having a keyboard assembly or the like. The bodies 52, 54 are rotatably connected to each other, that is, the body 52 can be rotated relative to the body 54 to stand on the body 54 to enter an open state, or overlap the body 54 to enter a closed state. Specifically, the camera module 100 is disposed on the body 52, and more specifically disposed at the edge of the body 52, preferably at the center of the edge. Further, the body 54 is correspondingly provided with a notch 56 to accommodate the camera module 100 when the bodies 52, 54 overlap each other. However, in other embodiments not shown, the electronic device may also be a device having a single body (such as a tablet computer, etc.), and the disclosure provides no limitation thereto.

Figure 2:
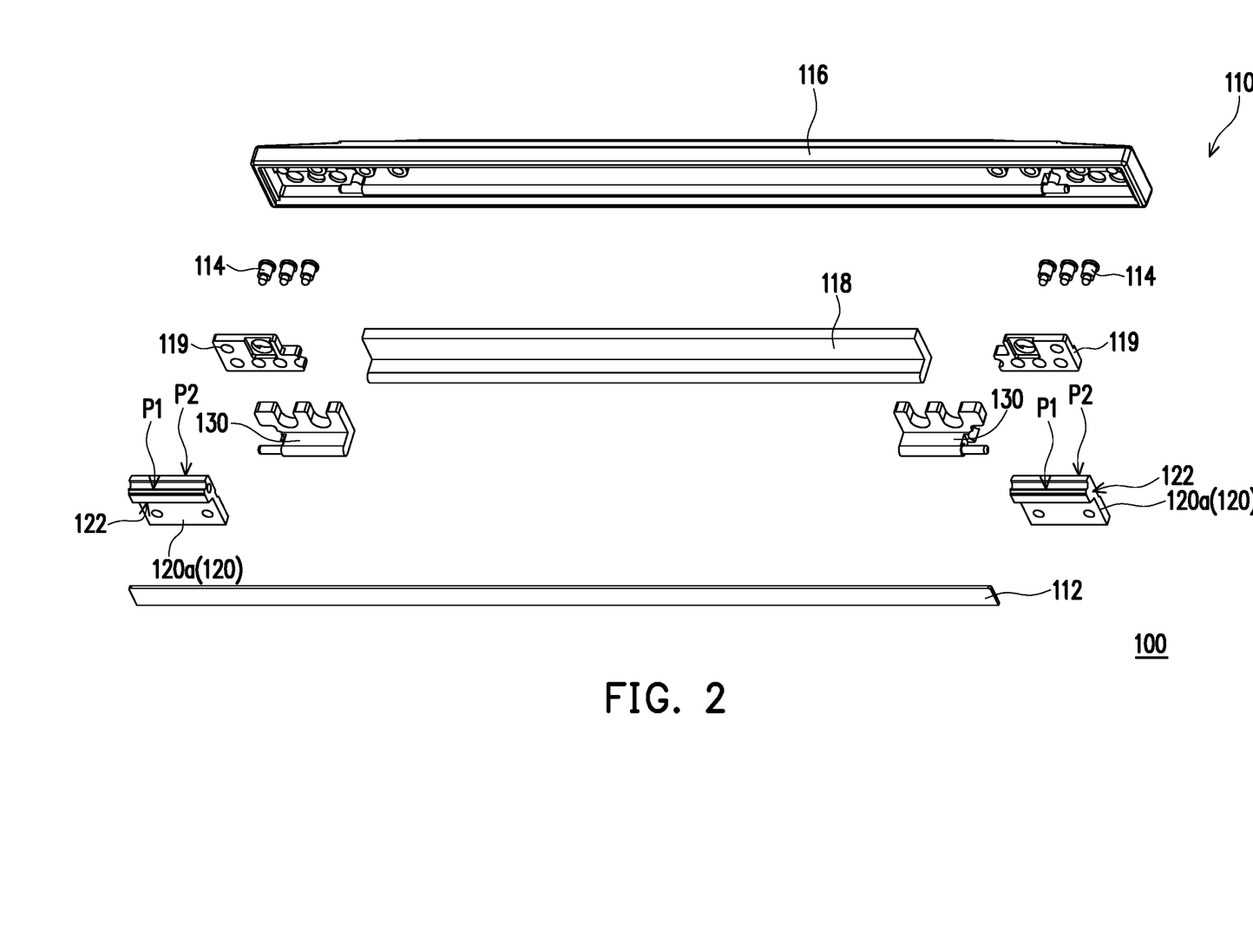
FIG. 2 is a schematic exploded view of the camera module of FIG. 1.
Figure 3A:
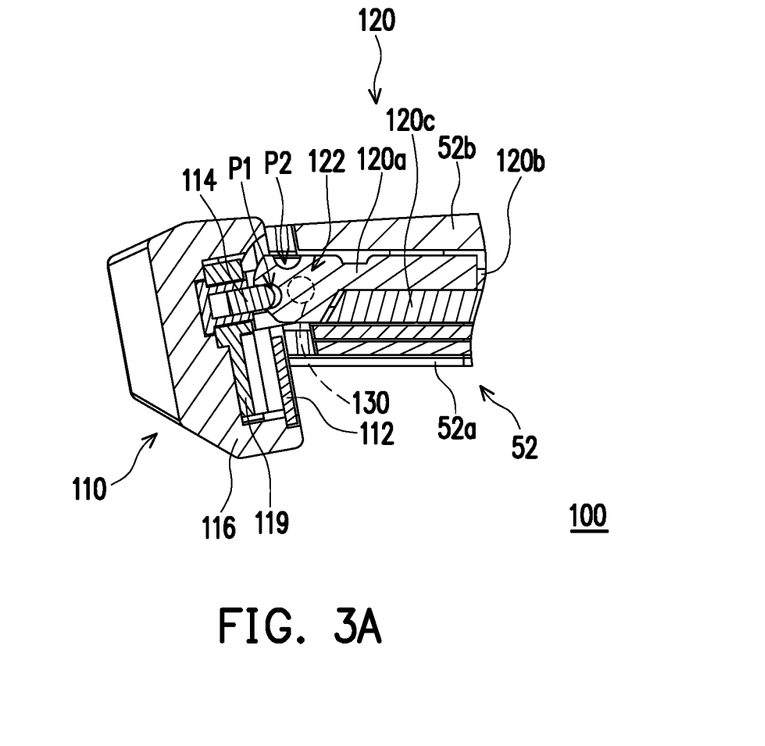
FIG. 3A is a schematic partial view of the camera module of FIG. 2.
Figure 3B:
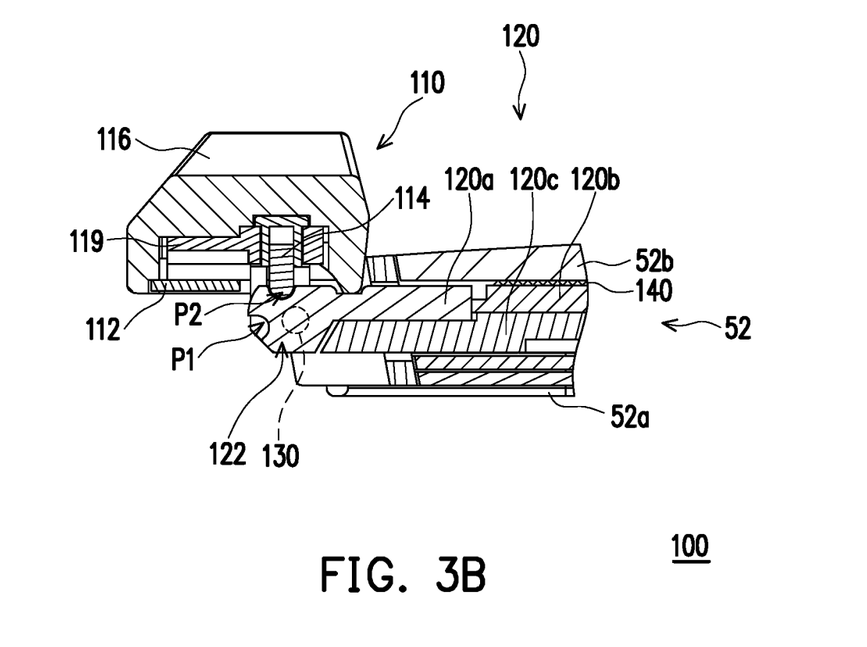
FIG. 3B is a schematic view showing the operation of the camera module of FIG. 3A in other states.

FIG. 2 is a schematic exploded view of the camera module of FIG. 1. FIG. 3A is a schematic partial view of the camera module of FIG. 2. FIG. 3B is a schematic view showing the operation of the camera module of FIG. 3A in other states. Referring to FIG. 2 to FIG. 3B, in the embodiment, the camera module 100 includes a camera component 110, a sliding member 120, and a pivotal member 130. The camera module 100 is disposed on the body 52, and the camera component 110 is rotatable between a closed position (as shown in FIG. 3A) and an open position (shown in FIG. 3B) relative to the body 52. The rotation may be that the user manually pushes the camera component 110 to rotate relative to the body 52, but is not limited thereto. Therefore, when the user does not need to use the camera module 100, the camera component 110 can be rotated to the closed position (as shown in FIG. 3A), thereby providing a privacy protection function. When the user needs to use the camera module 100, the camera component 110 can be rotated to an open position (as shown in FIG. 3B) to provide the camera operation functions (e.g., video, recording, photo taking, etc.).

Specifically, in the embodiment, the camera component 110 is rotatably disposed on the body 52, and the camera component 110 includes a lens 112 and an elastic positioning member 114. Furthermore, the sliding member 120 is slidably disposed on the body 52, and the end portion 122 of the sliding member 120 adjacent to of the camera component 110 is provided with at least two notches P1 and P2. The elastic positioning member 114 abuts against the end portion 122 of the sliding member 120. The pivotal member 130 is disposed on the body 52 and connected to the camera component 110 and the sliding member 120. In this manner, the camera component 110 can be rotated between the closed position (as shown in FIG. 3A) and the open position (as shown in FIG. 3B) through the pivotal member 130 to drive the sliding member 120 to move. When the camera component 110 is located at the closed position (as shown in FIG. 2A), the lens 112 and the sliding member 120 are hidden in the body 52, and the elastic positioning member 114 abuts against one (e.g., notch P1) of the two notches for positioning. When the camera component 110 is located at the open position (as shown in FIG. 3B), the lens 112 and the sliding member 120 are exposed from the body 52, and the elastic positioning member 114 abuts against the other (e.g., notch P2) of the two notches for positioning.

In this embodiment, since two pivotal members 130 respectively disposed on the left and right sides of the camera component 110 are used to enable the camera component 110 to rotate relative to the body 52, two sliding members 120 are respectively provided on the left and right sides of the camera component 110. Furthermore, the camera component 110 also adopts two sets of elastic positioning members 114 on the left and right sides respectively corresponding to the sliding member 120, and each set of elastic positioning members 114 includes two elastic positioning members 114 (see FIG. 2). In other words, although the following passage describes the relative relationship between the camera component 110, one sliding member 120 and one pivotal member 130, it is possible to be increased into a plurality of sets in pairs depending on the type of the electronic device 50. Further, although the following passage describes the relative relationship between one elastic positioning member 114 and the two notches P1 and P2, it is possible to be increased into a plurality of sets in pairs depending on the design of the electronic device 50. When a plurality of elastic positioning members 114 are used as a set to be disposed corresponding to the sliding member 120, the two notches P1 and P2 may adopted as two strip-shaped grooves extending laterally as shown in FIG. 2, or may be adopted as a plurality sets of notches P1 and P2 that are arranged laterally but not connected to each other. The disclosure provides no limitation to the above embodiment.

Further, in the embodiment, the camera component 110 includes a first cover 116, and the lens 112 and the elastic positioning member 114 are respectively disposed on the first cover 116 through the fixing plates 118 and 119, so that the camera component 110 can be configured as an assembly that is detachably assembled to the body 52 and that is rotatable relative to the body 52. The lens 112 of the camera component 110 is, for example, at least one of an optical visible lens or an infrared lens, but is not limited thereto. Furthermore, the body 52 includes an inner cover 52a and an outer cover 52b, wherein the inner cover 52a is, for example, a cover served as an operation surface of the body 52, and the outer cover 52b is, for example, another cover served as an appearance surface of the body 52, and the electronic assemblies (such as the camera module 100 and the screen assembly, not shown) for constituting the body 52 are disposed between the inner cover 52a and the outer cover 52b. As such, the camera component 110 is located at one end of the inner cover 52a and the outer cover 52b, and the pivotal member 130 and the sliding member 120 are connected to the camera component 110 and disposed between the inner cover 52a and the outer cover 52b so as to move between the inner cover 52a and the outer cover 52b relative to the body 52 when the camera component 110 is rotated relative to the body 52.

Moreover, the elastic positioning member 114 includes a spring connector, such as a spring-type pogo pin which abuts against the end portion 122 of the sliding member 120 adjacent to the camera component 110 through an elastic force. More specifically, the elastic positioning member 114 abuts against the notch P1 when the camera component 110 is located at the closed position (as shown in FIG. 3A), and abuts against the notch P2 when the camera component 110 is located at the open position (as shown in FIG. 3B). Since each of the two notches P1 and P2 respectively has an arc surface as shown in the figure, in the process where the camera component 110 is rotated to the closed position or the open position through the pivotal member 130, the elastic positioning member 114 can be moved out of the notch P1 or P2 along with the arc surface to accumulate the elastic force or moved in the notch P1 or P2 along the arc surface by releasing the elastic force. That is, when the camera component 110 is rotated from the closed position to the open position, the elastic positioning member 114 is moved along the arc surface of the notch P1 to be elastically pushed to be removed from the notch P1 and moved along the surface of the end portion 122. Until the elastic force is released, the elastic positioning member 114 is moved into the notch P2 along the arc surface of the notch P2, and vice versa.

It can be seen that during the rotation of the camera component 110, the elastic positioning member 114 always abuts against the surface of the end portion 122 and moves between the two notches P1 and P2, so the rotation range of the camera component 110 corresponds between the two notches P1 and P2. Preferably, the rotation range of the camera component 110 is between 80 degrees and 100 degrees, and most preferably 90 degrees, but the disclosure is not limited thereto. In this manner, the camera module 100 can be stably located at a desired position through the rotational friction between the internal member (such as the pivotal member 130) and the body 52 as well as the abutting force of the elastic positioning member 114 with respect to the sliding member 120. Specifically, when the camera component 110 is moved to the closed position or the open position, the elastic positioning member 114 is moved into the corresponding notch P1 or P2 to interfere with the sliding member 120, so that the camera component 110 can be more stably located at the closed position or the open position.

Further, when the elastic positioning member 114 is moved from the surface of the end portion 122 to the notch P1 or P2, the elastic positioning member 114 will generate a pause at a position corresponding to the notch P1 or P2. When the elastic positioning member 114 is moved out of the notch P1 or P2 to the surface of the end portion 122, the elastic positioning member 114 is pushed at the notch P1 or P2, so that the user can feel obvious operational touch through the cooperation of the elastic positioning member 114 and the notches P1 and P2, thereby acquiring whether the elastic positioning member 114 has been positioned at or removed from the notch P1 or P2. That is, the user can know whether the camera component 110 has been rotated to the closed position or the opened position through the operational touch obtained by operating the camera component 110. With such configuration, the camera module 100 and the electronic device 50 have good operability.

Figure 4A:
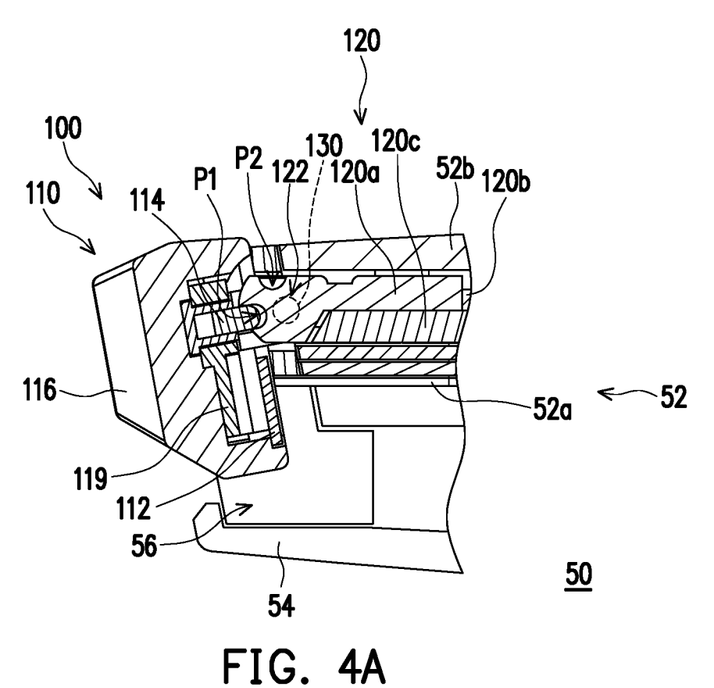
FIG. 4A is a schematic partial view of the electronic device of FIG. 1.
Figure 4B:
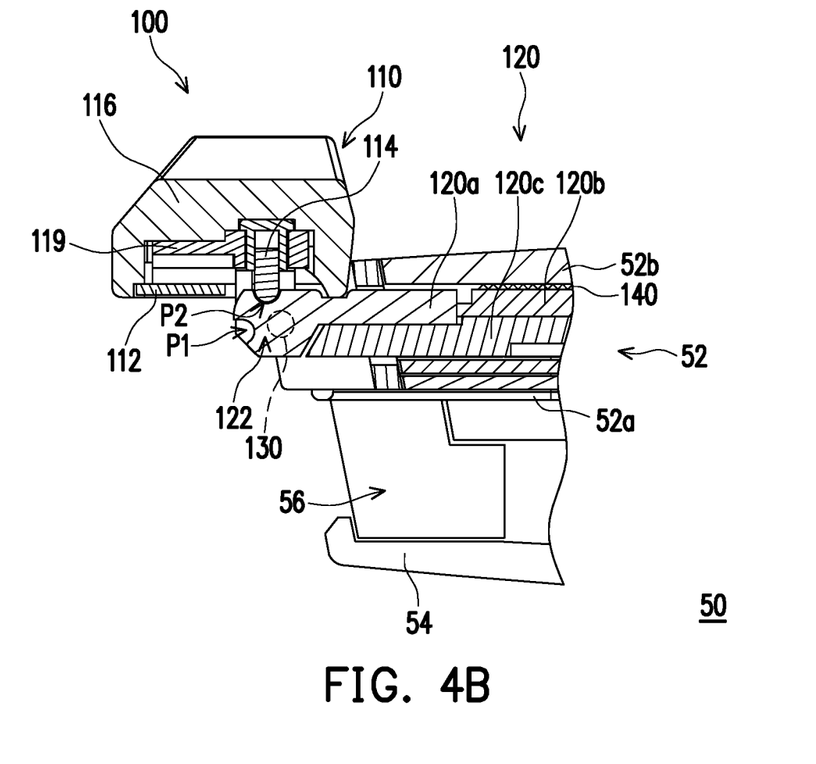
FIG. 4B is a schematic view showing the operation of the electronic device of FIG. 4A in other states.

FIG. 4A is a schematic partial view of the electronic device of FIG. 1. FIG. 4B is a schematic view showing the operation of the electronic device of FIG. 4A in other states. Referring to FIG. 2 to FIG. 4B, in the embodiment, the two notches P1 and P2 include a closing notch and an open notch respectively corresponding to the closed position and the open position. That is, the notch P1 serves as a closing notch, and the notch P2 serves as an open notch. The purpose of differentiating the notches P1 and P2 into the closed notch and the open notch is that the body 52 can be further electrically connected to the notch P2 which serves as the open notch, but not electrically connected to the notch P1 which serves as the closed notch. Specifically, the sliding member 120 is internally provided with an electrical connection line 58. The body 52 is electrically connected to the notch P2 which serves as an open notch through the electrical connection line 58, but the disclosure provides no limitation to the means for the body 52 to be electrically connected to the notch P2 which serves as the open notch, and the technical means can be adjusted depending on the needs.

As such, when the camera component 110 is located at the open position and the elastic positioning member 114 abuts against the notch P2 which as the open notch (as shown in FIG. 4B), the camera component 110 is electrically connected to the body 52 by the electrical connection line 58 through the elastic positioning member 114 and the notch P2 which serves as the open notch. When the camera component 110 is located at the closed position and the elastic positioning member 114 abuts against the notch P1 which serves as the closed notch (as shown in FIG. 4A), and when the camera component 110 is located at a position between the closed position and the open position while the elastic positioning member 114 abuts against the surface corresponding between the two notches P1 and P2 on the end portion 122 of the sliding member 120, the camera component 110 is not electrically connected to the body 52. In other words, the camera component 110 can only be electrically connected to the body 52 to provide camera operation function (e.g., video, recording, photo taking, and so on) when being located at the open position. Accordingly, when the user does not need to use the camera module 100, the camera component 110 cannot provide the camera operation function as long as the camera component 110 is located at a position other than the open position. That is, even if the camera component 110 is unintentionally moved from the closed position to the open position (e.g., the electronic device 50 is shaken unintentionally), the camera component 110 is not activated. Therefore, the privacy protection function of the camera module 100 can be improved, that is, it is possible to avoid that the electronic device 50 is hacked through unexpected connection and the user's information is obtained (e.g., video, recording, photo taking and so on) through the camera module 100 on the condition that the user does not operate the camera module 100. However, the present disclosure is not limited to the above implementations, and can be adjusted as needed.

Furthermore, in the present embodiment, the lens 112 and the elastic positioning member 114 are adjacent to each other and respectively located on opposite two sides of the first cover 116, so that the sliding member 120 on which the elastic positioning member 114 abuts and the pivotal member 130 connecting the camera component 110 to the sliding member 120 are also adjacent to the elastic positioning member 114. That is, the sliding member 120 and the pivotal member 130 may be regarded as being concentrated on one side of the camera component 110 on which the elastic positioning member 114 is disposed. It can be seen from the above that the center of rotation of the camera component 110 can be regarded as being closer to the side of the outer cover 52b of the body 52. When the camera component 110 is located at the closed position (as shown in FIG. 4A), the first cover 116 is located on the lateral surface 52c (i.e., the lateral sides of the inner cover 52a and the outer cover 52b) of the body 52, and the lens 112 and the sliding member 120 are hidden between the first cover 116 and the lateral surface 52c of the body 52. When the camera component 110 is located at the open position (as shown in FIG. 4B), the first cover 116 is located on the top surface 52d (i.e., the surface of the outer cover 52b) of the body 52, and the lens 112 and the sliding member 120 are exposed between the first cover 116 and the lateral surface 52c of the body 52.

Further, in the present embodiment, since the center of rotation of the camera component 110 may be regarded as being closer to the side of the outer cover 52b of the body 52, and the width of the first cover 116 is larger than the width (i.e., the distance between the inner cover 52a and the outer cover 52b) of the lateral surface 52c of the body 52, when the camera component 110 is located at the closed position (as shown in FIG. 4A), the first cover 116 is located on the lateral surface 52c of the body 52 and protrudes from the lateral surface 52c. When the camera component 110 is located at the open position (as shown in FIG. 4B), the first cover 116 is located on the top surface 52d of the body 52 and protrudes from the top surface 52d. As such, the camera module 100 can be operated more conveniently, but the present disclosure is not limited to the above implementation.

In addition, since the electronic device 50 of the present embodiment includes the two bodies 52 and 54, a recess 56 is further provided in the body 54 to accommodate the camera module 100. Specifically, the width of the recess 56 is greater than the width of the first cover 116 protruded from the lateral surface 52c, such that there is a gap between the recess 56 and the camera component 110 when the electronic device 50 is in the closed state (the body 52 and the body 54 overlap each other as shown in FIG. 4A and FIG. 4B), which allows the user to put finger into the gap between the recess 56 and the camera component 110 to push the camera component 110 to rotate when the electronic device 50 is in the closed state (the body 52 and the body 54 overlap each other as shown in FIG. 4A and FIG. 4B). That is, no matter whether the electronic device 50 is in the closed state (as shown in FIG. 4A and FIG. 4B) or in the open state (the body 52 is standing on the body 54 as shown in FIG. 1), the camera module 100 can be operated more conveniently.

Furthermore, referring to FIG. 3A to FIG. 4B, in the embodiment, the sliding member 120 actually includes a sliding base 120a, a first sliding member 120b, and a second sliding member 120c. The end portion 122 provided with at least two notches P1 and P2 is located at one end of the sliding base 120a, the first sliding member 120b is connected to the other end of the sliding base 120a, and the second sliding member 120c is disposed at the inner side of the sliding base 120a and the first sliding member 120b and fixedly connected to each other to constitute the sliding member 120. The implementation of constituting the sliding member 120 with the sliding base 120a, the first sliding member 120b and the second sliding member 120c facilitates assembling of the sliding member 120. However, in other embodiments not shown, a single member may be used as the sliding member 120, and the disclosure is not limited thereto.

Figure 5A:
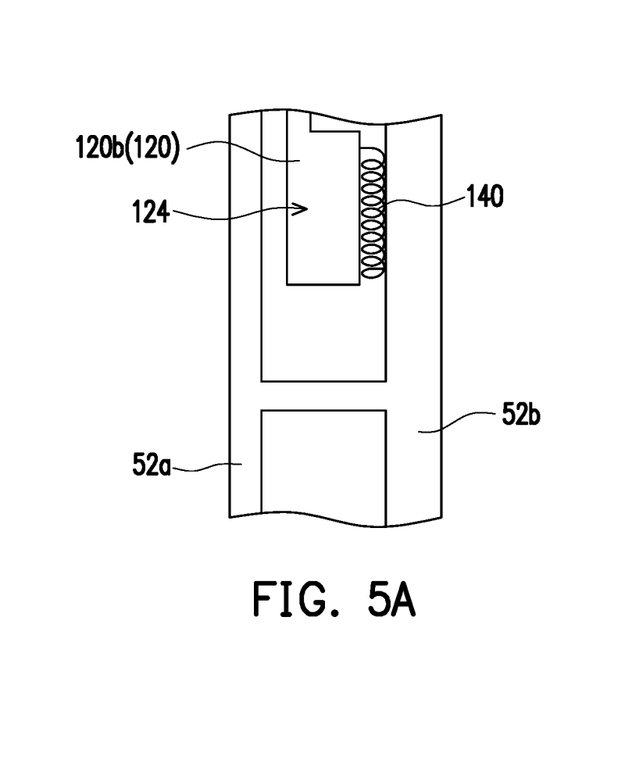
FIG. 5A is another schematic partial view of the camera module of FIG. 1.
Figure 5B:
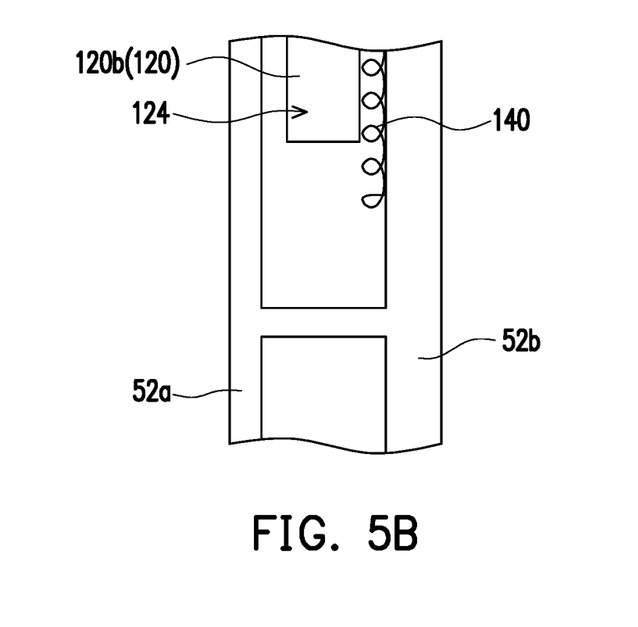
FIG. 5B is a schematic view showing the operation of the camera module of FIG. 5A in other states.

FIG. 5A is another schematic partial view of the camera module of FIG. 1. FIG. 5B is a schematic view showing the operation of the camera module of FIG. 5A in other states. Referring to FIG. 3B, FIG. 4B, FIG. 5A and FIG. 5B, in the embodiment, the camera module 100 further includes a restoring member 140 disposed between the body 52 and one end of the sliding member 120 opposite to the camera component 110. Further, the restoring member 140 is disposed between the outer cover 52b and the sliding member 120, specifically connected between the terminal end 124 of the sliding member 120 (for example, the first sliding member 120b) and the outer cover 52b, and thus the restoring member 140 can be stretched or restored by the movement of the sliding member 120 with respect to the outer cover 52b. That is, the restoring member 140 is in an initial state (as shown in FIG. 5A) when the camera component 110 is located at the closed position (as shown in FIG. 3A and FIG. 4A). Further, the restoring member 140 is stretched (as shown in FIG. 5B) and accumulates restoring force when the camera component 110 is rotated from the closed position (as shown in FIG. 3A and FIG. 4A) to the open position (as shown in FIG. 3B and FIG. 4B) and the sliding member 120 is moved toward outside of the body 52, and is restored to the initial state (as shown in FIG. 5A) by releasing the restoring force and drives the sliding member 120 to move toward inside of the body 52 when the camera component 110 is rotated from the open position (as shown in FIG. 3B and FIG. 4B) to the closed position (as shown in FIG. 3A and FIG. 4A).

In the present embodiment, since the restoring force of the restoring member 140 is smaller than the interference of the camera component 110 in which the elastic positioning member 114 abuts against the notch P2, when the camera component 110 is located at the open position and the elastic positioning member 114 abuts against the notch P2, the restoring member 140 is maintained in the stretched state. Until the elastic positioning member 114 is removed from the notch P2 in the process that the camera component 110 is rotated from the open position to the closed position, the sliding member 120 is driven to move toward inside of the body 52 by releasing the restoring force. It can be seen from the above that the configuration of the restoring member 140 contributes to the restoring of the sliding member 120. Although the restoring member 140 is illustrated as a spiral elastic member as an example, in other embodiments not shown, the type of the restoring member 140 may be adjusted according to requirements. Alternatively, the restoring member 140 is not limited to being disposed between the first sliding member 120b and the outer cover 52b as long as the restoring member 140 can achieve the above function between the body 52 and the sliding member 120. Moreover, the use of the restoring member 140 may be omitted while the sliding member 120 can be restored by self weight or manually restored by the user, the present disclosure provides no limitation to the type and availability of the restoring member 140.

In summary, in the camera module and the electronic device of the present disclosure, the camera component is rotated between the closed position and the open position through the pivotal member to drive the sliding member to move. The elastic positioning member abuts against the end portion of the sliding ember in the rotation process of the camera component. In this manner, the camera module can provide a privacy protection function or a camera operation function through rotation, and further interfere with the notch through the abutting force provided by the elastic positioning member so as to generate an obvious pause at the closed position and the open position. Furthermore, the body can only be electrically connected to the open notch corresponding to the open position according to the needs, such that the camera component can be electrically connected to the body through the elastic positioning member and the open notch only when being rotated to the open position. In this manner, the camera module and the electronic device of the present disclosure can provide the rotation operation function of the camera module and have good operability.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A camera module, adapted to be disposed on a body of an electronic device, the camera module comprising:
    a camera component, rotatably disposed on the body, and the camera component comprising a lens and at least one elastic positioning member;
    a sliding member, slidably disposed on the body, and one end portion of the sliding member adjacent to the camera component provided with at least two notches, and the elastic positioning member abutted against the end portion of the sliding member; and
    a pivotal member, disposed on the body and connected to the camera component and the sliding member,
    wherein the camera component is rotated between a closed position and an open position through the pivotal member to drive the sliding member to move.

2. The camera module according to claim 1, wherein when the camera component is located at the closed position, the lens and the sliding member are hidden in the body, and the elastic positioning member abuts against one of the two notches for positioning, when the camera component is located at the open position, the lens and the sliding member are exposed from the body, and the elastic positioning member abuts against the other of the two notches for positioning.

3. The camera module according to claim 1, wherein each of the two notches respectively has an arc surface, and the elastic positioning member is moved in or out of corresponding one of the two notches by moving along the arc surface.

4. The camera module according to claim 1, wherein a rotation range of the camera component corresponds between the two notches.

5. The camera module according to claim 4, wherein the rotation range of the camera component is between 80 degrees and 100 degrees.

6. The camera module according to claim 1, wherein the two notches comprise a closed notch and an open notch respectively corresponding to the closed position and the open position.

7. The camera module according to claim 6, wherein the body is electrically connected to the open notch, when the camera component is located at the open position and the elastic positioning member abuts against the open notch, the camera component is electrically connected to the body through the elastic positioning member and the open notch.

8. The camera module according to claim 6, wherein the sliding member is internally provided with an electrical connection line, and the body is electrically connected to the open notch through the electrical connection line.

9. The camera module according to claim 1, wherein the elastic positioning member comprises a spring connector.

10. The camera module according to claim 1, wherein the camera component comprises a first cover, the lens and the elastic positioning member are disposed on the first cover, when the camera component is located at the closed position, the first cover is located on a lateral surface of the body, and the lens and the sliding member are hidden between the first cover and the body.

11. The camera module according to claim 10, wherein when the camera component is located at the open position, the first cover is located on a top surface of the body, and the lens and the sliding member are exposed between the first cover and the body.

12. The camera module according to claim 10, wherein a width of the first cover is greater than a width of the lateral surface of the body, when the camera component is located at the closed position, the first cover is located on the lateral surface of the body and protrudes from the lateral surface, when the camera component is located at the open position, the first cover is located on the top surface of the body and protrudes from the top surface.

13. The camera module according to claim 1, further comprising a restoring member disposed between the body and one end of the sliding member opposite to the camera component, the restoring member accumulates a restoring force when the camera component is rotated from the closed position to the open position, and drives the sliding member to move toward inside of the body by releasing the restoring force when the camera component is rotated from the open position to the closed position.

14. An electronic device, comprising:
    a body; and
    a camera module, disposed on the body, the camera module comprising:

a camera component, rotatably disposed on the body, and the camera component comprising a lens and at least one elastic positioning member;

a sliding member, slidably disposed on the body, and one end portion of the sliding member adjacent to the camera component provided with at least two notches, and the elastic positioning member abutted against the end portion of the sliding member; and a pivotal member, disposed on the body and connected to the camera component and the sliding member, wherein the camera component is rotated between a closed position and an open position through the pivotal member to drive the sliding member to move.

15. The electronic device according to claim 14, wherein when the camera component is located at the closed position, the lens and the sliding member are hidden in the body, and the elastic positioning member abuts against one of the two notches for positioning, when the camera component is located at the open position, the lens and the sliding member are exposed from the body, and the elastic positioning member abuts against the other of the two notches for positioning.

16. The electronic device according to claim 14, wherein each of the two notches respectively has an arc surface, and the elastic positioning member is moved in or out of corresponding one of the two notches by moving along the arc surface.

17. The electronic device according to claim 14, wherein a rotation range of the camera component corresponds between the two notches.

18. The electronic device according to claim 17, wherein the rotation range of the camera component is between 80 degrees and 100 degrees.

19. The electronic device according to claim 14, wherein the two notches comprise a closed notch and an open notch respectively corresponding to the closed position and the open position.

20. The electronic device according to claim 19, wherein the body is electrically connected to the open notch, when the camera component is located at the open position and the elastic positioning member abuts against the open notch, the camera component is electrically connected to the body through the elastic positioning member and the open notch.

21. The electronic device according to claim 19, wherein the sliding member is internally provided with an electrical connection line, and the body is electrically connected to the open notch through the electrical connection line.

22. The electronic device according to claim 14, wherein the elastic positioning member comprises a spring connector.

23. The electronic device according to claim 14, wherein the camera component comprises a first cover, the lens and the elastic positioning member are disposed on the first cover, when the camera component is located at the closed position, the first cover is located on a lateral surface of the body, and the lens and the sliding member are hidden between the first cover and the body.

24. The electronic device according to claim 23, wherein when the camera component is located at the open position, the first cover is located on a top surface of the body, and the lens and the sliding member are exposed between the first cover and the body.

25. The electronic device according to claim 23, wherein a width of the first cover is greater than a width of the lateral surface of the body, when the camera component is located at the closed position, the first cover is located on the lateral surface of the body and protrudes from the lateral surface, when the camera component is located at the open position, the first cover is located on the top surface of the body and protrudes from the top surface.

26. The electronic device according to claim 14, wherein the camera module further comprises a restoring member disposed between the body and one end of the sliding member opposite to the camera component, the restoring member accumulates a restoring force when the camera component is rotated from the closed position to the open position, and drives the sliding member to move toward inside of the body by releasing the restoring force when the camera component is rotated from the open position to the closed position.

* * * * *